United States Patent

Glück et al.

[11] Patent Number: 6,046,247
[45] Date of Patent: Apr. 4, 2000

[54] PRODUCTION OF RIGID POLYURETHANE FOAMS HAVING A LOW THERMAL CONDUCTIVITY

[75] Inventors: Guiscard Glück, Mainz; Klaus Hahn, Kirchheim; Udo Rotermund, Ortrand; Otto Volkert, Weisenheim, all of Germany

[73] Assignee: BASF Aktiengesellschaft, Ludwigshafen, Germany

[21] Appl. No.: 09/110,745

[22] Filed: Jul. 2, 1998

[30] Foreign Application Priority Data

Jul. 4, 1997 [DE] Germany ............ 197 28 543

[51] Int. Cl.⁷ ...................................... C08J 9/00
[52] U.S. Cl. ............................................ 521/99
[58] Field of Search ................................ 521/99

[56] References Cited

U.S. PATENT DOCUMENTS

| | | |
|---|---|---|
| 5,023,280 | 6/1991 | Haas et al. |
| 5,082,870 | 1/1992 | Fukuda et al. ............ 521/99 |
| 5,151,222 | 9/1992 | Ruffoni ................... 521/99 |
| 5,155,199 | 10/1992 | Hayashi ................... 521/99 |
| 5,169,876 | 12/1992 | Heitmann . |
| 5,198,473 | 3/1993 | Gallagher et al. ........ 521/99 |
| 5,739,173 | 4/1998 | Lutter ..................... 521/99 |
| 5,844,014 | 12/1998 | Malone .................... 521/99 |
| 5,854,295 | 12/1998 | Sult et al. ................ 521/99 |

FOREIGN PATENT DOCUMENTS

| | | |
|---|---|---|
| 0 337 228 | 10/1989 | European Pat. Off. . |
| 0 464 204 A1 | 1/1992 | European Pat. Off. . |
| WO 90/11318 | 3/1989 | WIPO . |

*Primary Examiner*—Morton Foelak
*Attorney, Agent, or Firm*—Fernando A. Borrego

[57] ABSTRACT

Rigid polyurethane foams having a low thermal conductivity are produced by reacting a) organic and/or modified organic polyisocyanates with
b) at least one compound containing at least 2 reactive hydrogen atoms in the presence of
c) blowing agents,
d) catalysts and, if desired,
e) auxiliaries and/or additives, wherein graphite is added to the component a) and/or b).

5 Claims, No Drawings

PRODUCTION OF RIGID POLYURETHANE FOAMS HAVING A LOW THERMAL CONDUCTIVITY

The present invention relates to a process for producing rigid polyurethane, hereinafter referred to as PU for short, foams from formative components known per se in the presence of graphite and the use of these rigid PU foams for filling hollow spaces in refrigeration appliances or heating elements with foam and also as insulation material for composite elements.

The production of composite or sandwich elements which are composed of a rigid PU foam and at least one covering layer of a rigid or elastic material, e.g. paper, plastic films, metal sheets, glass nonwovens, particleboards, etc., is known. Also known is the filling of hollow spaces in household appliances such as refrigeration appliances, for example refrigerators or freezer chests, with rigid PU foam as insulation material or cladding hot water storage tanks with such foam. In order to avoid defects in the foam, the foamable PU reaction mixture has to be introduced into the hollow space to be insulated within a short time. Low-pressure or preferably high-pressure machines are customarily used for filling hollow spaces of such items with foam.

It is known that heat- and cold-insulating rigid PU foams suitable for this purpose can be produced by reacting organic polyisocyanates with one or more compounds containing at least two reactive hydrogen atoms, preferably polyester polyols and/or polyether polyols, customarily with concomitant use of chain extenders and/or crosslinkers, in the presence of blowing agents, catalysts and, if desired, auxiliaries and/or additives. If the formative components are selected appropriately, rigid PU foams having a low thermal conductivity and good mechanical properties can be obtained in this way.

A summary overview of the production of rigid PU foams and their use as covering or preferably core layer in composite elements and also their use as insulating layer in cooling or heating engineering has been published, for example, in Polyurethane, Kunststoff-Handbuch, Volume 7, 1st Edition 1966, edited by Dr. R. Vieweg and Dr. A. H öchtlen, and 2nd Edition 1983, edited by Dr. Günter Oertel, Carl Hanser Verlag, Munich, Vienna.

As blowing agents, use has been made in the past of chlorofluorocarbons (CFCs) which, owing to the known ozone problems, have more recently been replaced by hydrochlorofluorocarbons (HCFCs). Since even HCFCs have a certain ozone degradation potential, halogen-free blowing agents are being increasingly used. Typical representatives of this group of substances are n-pentane and cyclopentane. For technical reasons, foaming is not carried out using pentane alone, but $CO_2$ which is formed in situ by the reaction of NCO groups with water is employed as co-blowing agent. The disadvantage of the pentanes is their somewhat poorer insulation performance compared with CFCs. Reduction of the thermal conductivity of such foams is therefore an important problem.

The thermal conductivity of a foam is made up of 3 contributions: thermal conductivity of the gas phase, thermal conductivity of the matrix and thermal conductivity by radiation. Since blowing agent and matrix are fixed, the reduction of the radioactive component of the thermal conductivity is the most important possible method in practice.

It is known that the radioactive component of the thermal conductivity of foams can be reduced by addition of carbon black (JP 5 7147-510, DE 3 629 390, U.S. Pat. No. 4,795, 763, U.S. Pat. No. 5,137,930, U.S. Pat. No. 5,149,722, U.S. Pat. No. 5,192,607, JP 6 228 267, JP 7 082 402, U.S. Pat. No. 5,397,808, U.S. Pat. No. 5,565,497, EO-A-338 131, WO 94/13721, WO 95/10558). However, carbon black in PU foam has 2 great disadvantages: a) handling, in particular the dispersion of the very fine material in the starting components, is difficult and requires complicated precautionary measures and b) the relatively hard carbon black particles have, in the long term, an abrasive effect on the carefully ground pistons of the mixing heads of PU metering machines.

It is an object of the invention to reduce the thermal conductivity of rigid PU foams while overcoming the disadvantages resulting from the use of carbon black.

We have found that this objective is achieved by using graphite instead of carbon black as additive. This gives a better reduction in the thermal conductivity of PU foams and, owing to its physical nature, graphite does not have the abovementioned adverse processing properties of carbon black.

The present invention accordingly provides a process for producing rigid PU foams having a low thermal conductivity by reacting a) organic and/or modified organic polyisocyanates with b) at least one compound containing at least 2 reactive hydrogen atoms and, if desired, c) blowing agents d) catalysts and, if desired, e) auxiliaries and/or additives, wherein the foams further comprise graphite.

The graphite content of the PU foam is preferably 1–20% by weight, in particular 1–10% by weight, based on the weight of the foam. Lower contents do not sufficiently lower the thermal conductivity while higher contents can lead to damage to the foam framework.

It is particularly advantageous if at least 50% of the graphite has a particle size of less than 20 $\mu$m.

To produce the rigid PU foams by the process of the present invention, use is made of formative components known per se about which the following details may be given.

a) Suitable organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocanate, 2-ethyltetramethylene 1,4-diisocyanate, 2-methylpentamethylene 1,5-diisocyanate tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'- and 2,2'-diisocyanate and also the corresponding isomer mixtures and preferably aromatic diisocyanates and polyisocyanates such as tolylene 2,4- and 2,6-diisocyanate and the corresponding isomer mixtures, diphenylmethane 4,4'-, 2,4'- and 2,2,'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of mixtures.

Use is frequently also made of modified polyfunctional isocyanates, ie. products which are obtained by partial chemical reaction of organic diisocyanates and/or polyisocyanates. Examples which may be mentioned are diisocyanates and/or polyisocyanates containing ester, urea, biuret, allophanate, carbodiimide, isocyanurate and/or urethane groups. Specific examples are: organic, preferably aromatic polyisocyanates containing urethane groups and having NCO contents of from 33.6 to 15% by weight, preferably from 31 to 21% by weight, based on the total weight, diphenylmethane 4,4'-diisocyanate or tolylene 2,4- or 2,6-diisocyanate modified, for example, with low molecular weight diols, triols, dialkylene glycols, trialkylene glycols or polyoxyalkylene glycols having molecular weights of up to 1500, where examples of dialkylene or polyoxyalkylene glycols which can be used individually or as mixtures are: diethylene glycol, dipropylene glycol, polyoxyethylene, polyoxypropylene and polyoxypropylene-polyoxyethylene glycols or triols. Also suitable are prepolymers containing NCO groups and having NCO contents of from 25 to 9% by weight, preferably from 21 to 14% by weight, based on the total weight, prepared from the polyester polyols and/or preferably polyether polyols described below and diphenylmethane 4,4'-diisocyanate, tolylene 2,4- and/ or 2,6-diisocyanates or crude MDI. Further modified isocyanates which have been found to be useful are liquid polyisocyanates containing carbodiimide groups and/or isocyanurate rings and having NCO contents of from 33.6 to 15% by weight, preferably from 31 to 21% by weight, based on the total weight, eg. those based on diphenylmethane 4,4'-, 2,4'- and/or 2,2'-diisocyanate and/or tolylene 2,4- and/or 2,6-diisocyanate.

The modified polyisocyanates can, if desired, be mixed with one another or with unmodified organic polyisocyanates such as diphenylmethane 2,2'- and/or 4,4'-diisocyanate, crude MDI, tolylene 2,4- and/or 2,6-diisocyanate.

Organic polyisocyanates which have been found to be particularly useful and are therefore preferably employed for producing the rigid PU foams are: mixtures of tolylene diisocyanates and crude MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or crude MDI and in particular crude MDI having a diphenylmethane diisocyanate isomer content of from 30 to 80% by weight, preferably from 30 to 55% by weight.

b) Suitable compounds containing at least two reactive hydrogen atoms (b) are preferably polyhydroxyl compounds having a functionality of from 2 to 8, preferably from 3 to 8, and a hydroxyl number of from 150 to 850, preferably from 350 to 800, and also, if desired, chain extenders and/or crosslinkers.

Examples of polyhydroxyl compounds which may be mentioned are polythioether polyols, polyesteramides, hydroxyl-containing polyacetals, hydroxyl-containing aliphatic polycarbonates and preferably polyester polyols and polyether polyols. Mixtures of at least two of the polyhydroxyl compounds mentioned can also be employed as long as these have an average hydroxyl number in the abovementioned range.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic monoesters or diesters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gases such as nitrogen, carbon dioxide, helium, argon, etc., in the melt at from 150 to 250° C., preferably from 180 to 220° C., under atmospheric or subatmospheric pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

To prepare the polyester polyols, the organic polycarboxylic acids and/or derivatives and polyhydric alcohols are polycondensed, advantageously in a molar ratio of from 1:1–1.8, preferably 1:1.05–1.2.

The polyester polyols obtained preferably have a functionality of from 2 to 3 and a hydroxyl number of from 150 to 400 and in particular from 200 to 300.

However, the polyhydroxyl compounds used are particularly preferably polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts and at least one initiator molecule which contains from 2 to 8, preferably from 3 to 8 reactive hydrogen atoms in bonded form or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated, N,N- and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,2- or 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Further suitable initiator molecules are: alkanolamines such as ethanolamine, diethanolamine, N-methylethanolamine and N-ethylethanolamine, N-methyldiethanolamine and N-ethyldiethanolamine and triethanolamine, and ammonia.

Preference is given to using polyhydric, in particular trihydric and/or higher-hydric alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols have a functionality of preferably from 3 to 8 and in particular from 3 to 6 and hydroxyl numbers of preferably from 300 to 850 and in particular from 350 to 800.

Further suitable polyether polyols are melamine-polyether polyol dispersions as described in EP-A-23 987 (U.S. Pat. No. 4,293,657), polymer-polyether polyol dispersions prepared from polyepoxides and epoxy resin hardeners in the presence of polyether polyols as described in DE 29 43 689 (U.S. Pat. No. 4,305,861), dispersions of aromatic polyesters in polyhydroxyl compounds as described in EP-A-62 204 (U.S. Pat. No. 4,435,537) or DE-A 33 00 474, dispersions of organic and/or inorganic fillers in polyhydroxyl compounds as described in EP-A-11 751 (U.S. Pat. No. 4,243,755), polyurea-polyether polyol dispersions as described in DE-A-31 25 402, tris (hydroxyalkyl) isocyanurate-polyether polyol dispersions as described in EP-A-136 571 (U.S. Pat. No. 4,514,526) and crystallite suspensions as described in DE-A-33 42 176 and DE-A-33 42 177 (U.S. Pat. No. 4,560,708), where the disclosures in the patent publications mentioned are incorporated by reference into the present patent description.

Like the polyester polyols, the polyether polyols can be used individually or in the form of mixtures. They can also be mixed with the abovementioned dispersions, suspensions or polyester polyols and with the hydroxyl-containing polyesteramides, polyacetals and/or polycarbonates.

Suitable hydroxyl-containing polyacetals are, for example, the compounds which can be prepared from glycols such as diethylene glycol, triethylene glycol, 4,4'-dihydroxyethoxy-diphenyldimethylmethane or hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear condensates obtained from polybasic saturated and/or unsaturated carboxylic acids or their anhydrides and amino alcohols or mixtures of polyfunctional alcohols and amino alcohols and/or polyamines.

The rigid PU foams can be produced with or without use of chain extenders and/or crosslinkers. However, the addition of chain extenders, crosslinkers or, if desired, mixtures thereof can prove to be advantageous for modifying the mechanical properties. Chain extenders and/or crosslinkers used are preferably alkanolamines and in particular diols and/or triols having molecular weights of less than 400, preferably from 60 to 300. Examples of suitable chain extenders/crosslinkers are alkanolamines such as ethanolamine and/or isopropanolamine, dialkanolamines such as diethanolamine, N-methyldiethanolamine, N-ethyldiethanolamine, diisopropanolamine, trialkanolamines such as triethanolamine, triisopropanolamine and the addition products of ethylene oxide or 1,2-propylene oxide and alkylenediamines having from 2 to 6 carbon atoms in the alkylene radical, eg. N,N'-tetra (2-hydroxyethyl)ethylenediamine and N,N'-tetra(2-hydroxypropyl)ethylenediamine, aliphatic, cycloaliphatic and/or araliphatic diols having from 2 to 14, preferably from 4 to 10, carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)-hydroquinone, triols such as 1,2,4- or 1,3,5-trihydroxy-cyclohexane, glycerol and trimethylolpropane and low molecular weight hydroxyl-containing polyalkylene oxides based on ethylene oxide and/or 1,2-propylene oxide and aromatic diamines such as tolylenediamines and/or diamino-diphenylmethanes and also the abovementioned alkanolamines, diols and/or triols as initiator molecules.

If chain extenders, crosslinkers or mixtures thereof are employed for producing the rigid PU foams, they are advantageously used in an amount of from 0 to 20% by weight, preferably from 2 to 5% by weight, based on the weight of the compounds containing at least two reactive hydrogen atoms.

c) Blowing agents used are the customary physical blowing agents such as alkanes, alkenes, cycloalkanes, esters, ethers, ketones, acetals, fluoroalkanes, hydrofluorochloroalkanes, etc. Specific examples are: butane, n-pentane, iso-pentane, cyclopentane, cyclohexane, methyl formate, ethyl formate, methyl acetate, ethyl acetate, methyl ethyl ether, diethyl ether, acetone, formaldehyde dimethyl acetal, tetrafluoroethane, difluorochloromethane or 1,1,1-dichlorofluoroethane. Naturally, the physical blowing agents can also be used as mixtures. A combination of physical blowing agents and water, ie. $CO_2$ which is formed in the reaction of water with isocyanate, is advantageous and preferred.

d) Catalysts (e) used are, in particular, compounds which greatly accelerate the reaction of the hydroxyl-containing compounds of the component (b) with the polyisocyanates. Suitable catalysts are organic metal compounds, preferably organic tin compounds such as tin(II) salts of organic carboxylic acids, eg. tin(II) acetate, tin(II) octoate, tin(II) ethylhexanoate and tin (II) laurate, and the dialkyltin(IV) salts of organic carboxylic acids, eg. dibutyltin diacetate, dibutyltin dilaurate, dibutyltinmaleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N', N'-tetramethylethylenediamine, N,N,N',N'-tetramethyl-butanediamine or N,N,N',N'-tetramethylhexanediamine, pentamethyldiethylenetriamine, bis (dimethylaminoethyl) ether, bis(dimethylaminopropyl) urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethyl-ethanolamine.

Further suitable catalysts are: tris(dialkylaminoalkyl)-s-hexahydrotriazines, in particular tris(N,N-dimethylaminopropyl)-s-hexahydrotriazine, tetraalkylammonium hydroxide such as tetramethylammonium hydroxide, alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the component (b).

e) If desired, auxiliaries and/or additives (e) can also be incorporated into the reaction mixture for producing the rigid PU foams. Examples which may be mentioned are surface-active substances, foam stabilizers, cell regulators, fillers, dyes, pigments, flame retardants, hydrolysis inhibitors, fungistatic and bacteriostatic substances.

Suitable surface-active substances are, for example, compounds which serve to aid the homogenization of the starting materials and may also be suitable for regulating the cell structure. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxalkylene copolymers and other organopolysiloxanes, ethoxylated alkylphenols, ethoxylated fatty alcohols, paraffin oils, castor oil or ricinoleic esters, Turkey red oil and peanut oil and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the component (b).

Fillers, in particular reinforcing fillers, are, for the purposes of the present invention, the customary organic and inorganic fillers, reinforcing materials, weighting agents, agents for improving the abrasion behavior in paints, coatings, etc, known per se. Specific examples are: inorganic fillers such as siliceous minerals, for example sheet silicates such as antigorite, serpentine, hornblends, amphiboles, chrysotile, talc; metal oxides such as kaolin, aluminum oxide, aluminum silicate, titanium oxides and iron oxides, metal salts such as chalk, barite and inorganic pigments such as cadmium sulfide, tinsulfide and also glass particles. Examples of suitable organic fillers are: melamine, rosin, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of the components (a) and (b).

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetracis(2-chloroethyl)ethylene diphosphate.

Apart from the abovementioned halogen-substituted phosphates, it is also possible to use inorganic flame retardants such as red phosphorus, hydrated aluminum oxide, antimony trioxide, arsenic oxide, ammonium polyphosphate and calcium sulfate or cyanuric acid derivatives such as melamine or mixtures of at least two flame retardants such as ammonium polyphosphates and melamine and also, if desired, starch for making the rigid PU foams produced according to the invention flame resistant. In general, it has been found to be advantageous to use from 5 to 50 parts by weight, preferably from 5 to 25 parts by weight, of the abovementioned flame retardants or mixtures for each 100 parts by weight of the components (a) to (c).

Further details regarding the abovementioned other customary auxiliaries and additives may be found in the specialist literature, for example the monograph by J. H. Saunders and K. C. Frisch "High Polymers", Volume XVI, Polyurethanes, Parts 1 and 2, Interscience Publishers 1962 or 1964, or the Kunststoff-Handbuch, Polyurethane, Volume VII, Carl-Hanser-Verlag, Munich, Vienna, 1st, 2nd and 3rd Editions, 1966, 1983 and 1993.

According to the present invention, graphite is used as additive for reducing the thermal conductivity. Graphite can be added in an amount of up to 20% by weight, preferably from 1 to 10% by weight, based on the foam. Particularly useful forms of graphite are finely milled graphite grains which have a particle distribution in which at least 50% is less than 20 $\mu$m, preferably less than 10 $\mu$m.

It is advantageous to disperse the graphite with stirring in the formative component (a) and/or in the formative component (b) before producing the foam by mixing the components.

To produce the rigid PU foams, the organic, unmodified or modified polyisocyanates (a), the relatively high molecular weight compounds containing at least two reactive hydrogen atoms and, if desired, chain extenders and/or crosslinkers (b) are reacted in such amounts that the equivalence ratio of NCO groups of the polyisocyanates (a) to the sum of the reactive hydrogen atoms of the component (b) is 0.85–1.25:1, preferably 0.95–1.15:1 and in particular about 1.0–1.10:1. If the foams containing urethane groups are modified by the formation of isocyanurate groups, for example to increase the flame resistance, it is usual to employ a ratio of NCO groups of the polyisocyanates (a) to the sum of the reactive hydrogen atoms of the component (b) of 1.5–10:1, preferably 1.5–6:1.

The rigid PU foams can be produced batchwise or continuously by the prepolymer method or preferably by the one-shot method with the aid of known mixing equipment.

It has been found to be particularly advantageous to employ the two-component process and to combine the formative components (b), (c), (d) and, if used, (e) as the polyol component (A component) and to use the organic polyisocyanates and, if desired, blowing agents (c) as component (B).

The starting components are mixed at from 15 to 90° C., preferably from 20 to 35° C., and introduced into an open, heated or unheated mold in which the reaction mixture is allowed to foam essentially without application of pressure to avoid a compacted surface zone. To form composite elements, one side, advantageously the reverse side, of a covering layer is coated with the foamable reaction mixture, eg. by casting or spraying, and the mixture is allowed to foam and cure to give the rigid PU foam.

The rigid PU foams produced by the process of the present invention preferably have densities of from 20 to 50 g/l.

The rigid PU foams are preferably used as thermally insulating intermediate layer in composite elements and for filling hollow spaces in refrigeration appliance housings, in particular for refrigerators and freezer chests, with foam and as outer cladding of hot water storage tanks. The products are also suitable for insulating heated materials, as engine covering and as sheathing for pipes.

EXAMPLES

In all examples, foams were produced in a wooden mold having the dimensions 20×20×20 cm. To measure the thermal conductivity, specimens having the dimensions 20×20×5 cm were sawn from the foam block and measured in a customary laboratory instrument (model: Lambda-Control from Hesto/6070, Langen). Since, in practice, the gas-phase composition of the foams and thus the thermal conductivity changes on storage as a result of $CO_2$ diffusing out and air diffusing in, the specimens were heated at 70° C. for 7 days before the measurement. Experience has shown that the $CO_2$/air exchange is concluded after this time and constant thermal conductivity values are obtained. Measurements were carried out both parallel and perpendicular to the foaming direction, since free-foamed PU foams normally display anisotropy and the thermal conductivities in the two directions are different.

The following 5 types of graphite were used (manufacturer: Graphitwerk Kropfmühl AG).

| Type | Manufacturer's designation | % C (minimum) | Particle size distribution (50% value) |
|---|---|---|---|
| A | AF | 96–97 | 8.5–11.0 μm |
| B | AFspez. | 99.5 | 6.0–8.5 |
| C | UF 4 | 96–97 | 5.5–7.0 |
| D | UF 4 | 99.5 | 5.5–7.0 |
| E | UF 2 | 96–97 | 4.0–5.5 |

To produce the foams, a polyol premix having the following composition was prepared.

78 parts by weight of a polyether polyol having a hydroxyl number of 400 mg KOH/g and prepared by anionic polyaddition of 1,2-propylene oxide onto sucrose.

15 parts by weight of a polyether polyol having a hydroxyl number of 105 mg KOH/g and prepared by anionic polyaddition of 1,2-propylene oxide onto dipropylene glycol.

2.5 parts by weight of a foam stabilizer based on silicone (Polyurax® SR 321 from UCC)

2.0 parts by weight of N,N-dimethylcyclohexylamine

The respective blowing agent was added to the polyol premix and graphite was subsequently stirred in. The dispersions obtained were mixed with Lupranat® M20 (mixture of diphenylmethane diisocyanate and polyphenylpolymethylene polyisocyanate, NCO content 31% by weight) and allowed to foam. The composition of the reaction mixtures of the individual examples, the measured thermal conductivity values after $CO_2$/air exchange has been completed and also the reduction in the thermal conductivity values achieved by graphite addition are shown in the table.

TABLE 1

| | Example | | | | | | | |
|---|---|---|---|---|---|---|---|---|
| | 1 (Comparison) | 2 | 3 | 4 | 5 | 6 | 7 (Comparison) | 8 |
| Polyol premix | 97.5 | 97.5 | 97.5 | 97.5 | 97.5 | 97.5 | 97.5 | 97.5 |
| Water | 2.2 | 2.2 | 2.2 | 2.2 | 2.2 | 2.2 | 2.5 | 2.5 |
| n-Pentane | — | — | — | — | — | — | 11 | 11 |
| Cycopentane | 9 | 9 | 9 | 9 | 9 | 9 | — | — |
| Graphite A | — | 3 | — | — | — | — | — | 3 |
| Graphite B | — | — | 3 | — | — | — | — | — |
| Graphite C | — | — | — | 3 | — | — | — | — |
| Graphite D | — | — | — | — | 3 | — | — | — |
| Graphite E | — | — | — | — | — | 3 | — | — |
| Foam density (g/l) | 28.4 | 28.6 | 29.6 | 29.4 | 29.5 | 28.8 | 25.4 | 26.1 |

TABLE 1-continued

| | Example | | | | | | | |
|---|---|---|---|---|---|---|---|---|
| | 1 (Comparison) | 2 | 3 | 4 | 5 | 6 | 7 (Comparison) | 8 |
| Thermal conductivity parallel to the foaming direction (mW/mK) | 29.3 | 27.6 | 27.4 | 27.2 | 26.7 | 27.8 | 29.7 | 28.1 |
| Thermal conductivity reduction (mW/mK) | — | 1.7 | 1.9 | 2.1 | 2.6 | 1.5 | — | 1.6 |
| Thermal conductivity perpendicular to the foaming direction (mW/mK) | 21.8 | 21.0 | 21.0 | 21.1 | 20.6 | 21.3 | 22.1 | 21.5 |
| Thermal conductivity reduction | — | 0.8 | 0.8 | 0.7 | 1.2 | 0.5 | — | 0.6 |

We claim:

1. A process for producing rigid polyurethane foams having a low thermal conductivity comprising reacting
   a) organic and/or modified organic polyisocyanates with
   b) at least one compound containing at least 2 reactive hydrogen atoms in the presence of
   c) blowing agents,
   d) catalysts and, optionally,
   e) auxiliaries and/or additives,
wherein a graphite compound other than expandable graphite is added to the component a) and/or b).

2. A process as claimed in claim 1, wherein the graphite content of the foam is a positive amount up to 20 percent by weight.

3. A process as claimed in claim 1, wherein the graphite content of the foam is from 1 to 10% by weight.

4. A process as claimed in claim 1, wherein at least 50% of the graphite has a particle size of less than 20 μm.

5. A rigid polyurethane foam produced in accordance with the process as claimed in any of claims 1 to 4.

* * * * *